(12) United States Patent
Merritt

(10) Patent No.: US 9,615,693 B1
(45) Date of Patent: *Apr. 11, 2017

(54) VENTED CHIMNEY CAP SYSTEM AND METHOD THEREOF

(71) Applicant: Matthew H. Merritt, Ponte Vedra Beach, FL (US)

(72) Inventor: Matthew H. Merritt, Ponte Vedra Beach, FL (US)

(73) Assignee: SMOKEWARE.NET LLC, Ponte Vedra Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/716,616

(22) Filed: May 19, 2015

Related U.S. Application Data

(63) Continuation-in-part of application No. 13/773,769, filed on Feb. 22, 2013, now Pat. No. 9,392,905.

(60) Provisional application No. 61/602,428, filed on Feb. 23, 2012.

(51) Int. Cl.
*F23J 13/08* (2006.01)
*A47J 37/07* (2006.01)
*B23P 19/04* (2006.01)

(52) U.S. Cl.
CPC ....... *A47J 37/0786* (2013.01); *A47J 37/0704* (2013.01); *B23P 19/04* (2013.01)

(58) Field of Classification Search
CPC .. F23J 2213/50; A47J 37/0704; A47J 37/0786
USPC .......................................................... 454/5
See application file for complete search history.

(56) References Cited

U.S. PATENT DOCUMENTS

| | | | | |
|---|---|---|---|---|
| 941,900 A | * | 11/1909 | Wood | F23J 13/00 126/299 F |
| 2,030,205 A | * | 2/1936 | Green | F23L 17/02 126/307 A |
| 2,528,312 A | * | 10/1950 | Jorgensen | F24C 3/085 126/214 C |
| 2,771,763 A | * | 11/1956 | Kracauer | F21L 19/00 431/146 |
| 2,823,599 A | * | 2/1958 | Still | F23L 17/10 454/182 |
| 2,851,941 A | * | 9/1958 | Cogar | A47B 31/02 126/25 A |
| 4,203,438 A | * | 5/1980 | Shiu | A61B 18/06 604/24 |
| 4,455,996 A | * | 6/1984 | Achilles, Sr. | F23M 11/047 126/200 |

(Continued)

*Primary Examiner* — Steven B McAllister
*Assistant Examiner* — Jonathan Cotov
(74) *Attorney, Agent, or Firm* — Mark Young, P.A.

(57) ABSTRACT

An adjustable vented chimney cap system has a cylindrical base member with vent openings and a cap member that has a cover member and a cylindrical body with vent openings. The base member may be mounted onto the chimney of a grill. The cap member may be mounted onto the base member whereby the cap member can be rotated relative to the base member such that the vent openings can be adjusted to control the amount of hot gases escaping from the grill. In some embodiments, the vent openings in the cap member and the vent openings in the base member may have the same geometry. In some embodiments, the vent openings in the cap member and vent openings in the base member may have different geometries.

20 Claims, 15 Drawing Sheets

(56) References Cited

U.S. PATENT DOCUMENTS

| | | | | |
|---|---|---|---|---|
| 4,624,239 A * | 11/1986 | Yellin | A47J 37/0786 | 126/160 |
| 4,649,808 A * | 3/1987 | Ward | F23J 15/022 | 126/504 |
| 4,690,756 A * | 9/1987 | Van Ry | A01K 61/007 | 210/170.06 |
| 4,788,906 A * | 12/1988 | Starks | A47J 37/0704 | 126/25 R |
| 5,180,331 A * | 1/1993 | Daw | F24F 13/068 | 454/187 |
| 5,325,841 A * | 7/1994 | Hooper, Sr. | A47J 37/0704 | 126/25 R |
| 5,404,801 A * | 4/1995 | Holland | A47J 37/0786 | 126/25 R |
| 5,865,099 A * | 2/1999 | Waugh | A47J 37/0786 | 126/25 R |
| 6,029,650 A * | 2/2000 | Treants | F23D 3/16 | 126/204 |
| 6,363,925 B1 * | 4/2002 | Chavana, Jr. | A47J 37/0786 | 126/245 |
| 6,470,875 B2 * | 10/2002 | Liu | A23B 4/052 | 126/25 R |
| D473,414 S * | 4/2003 | Neal | D7/332 | |
| 6,606,986 B2 * | 8/2003 | Holland | A47J 37/0704 | 126/25 R |
| 7,328,696 B2 * | 2/2008 | Rodriguez | A47J 37/0704 | 126/30 |
| 7,984,709 B1 * | 7/2011 | Byrnes | A47J 37/0704 | 126/25 R |
| 8,574,045 B2 * | 11/2013 | Warner | E03B 11/08 | 138/32 |
| 2002/0179081 A1 * | 12/2002 | Holland | A47J 37/0704 | 126/25 R |
| 2006/0213497 A1 * | 9/2006 | Orozco | A47J 37/0786 | 126/41 R |
| 2006/0246833 A1 * | 11/2006 | Arnold | E04F 17/026 | 454/12 |
| 2009/0308373 A1 * | 12/2009 | Scott | A47J 36/06 | 126/25 R |
| 2011/0283990 A1 * | 11/2011 | Walters | A47J 37/0704 | 126/25 R |

\* cited by examiner

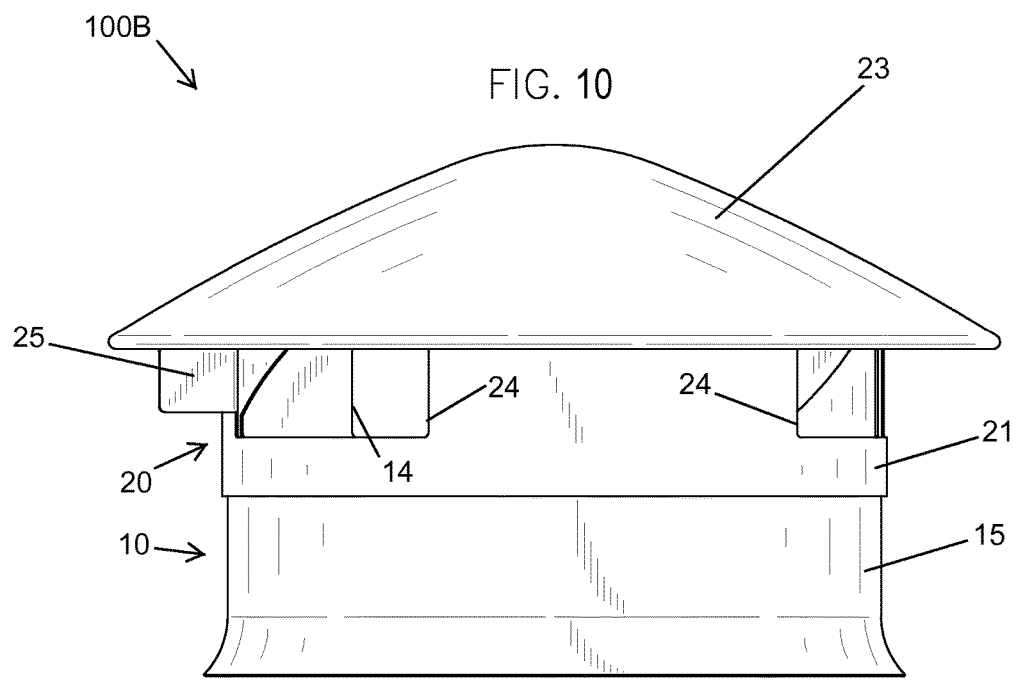
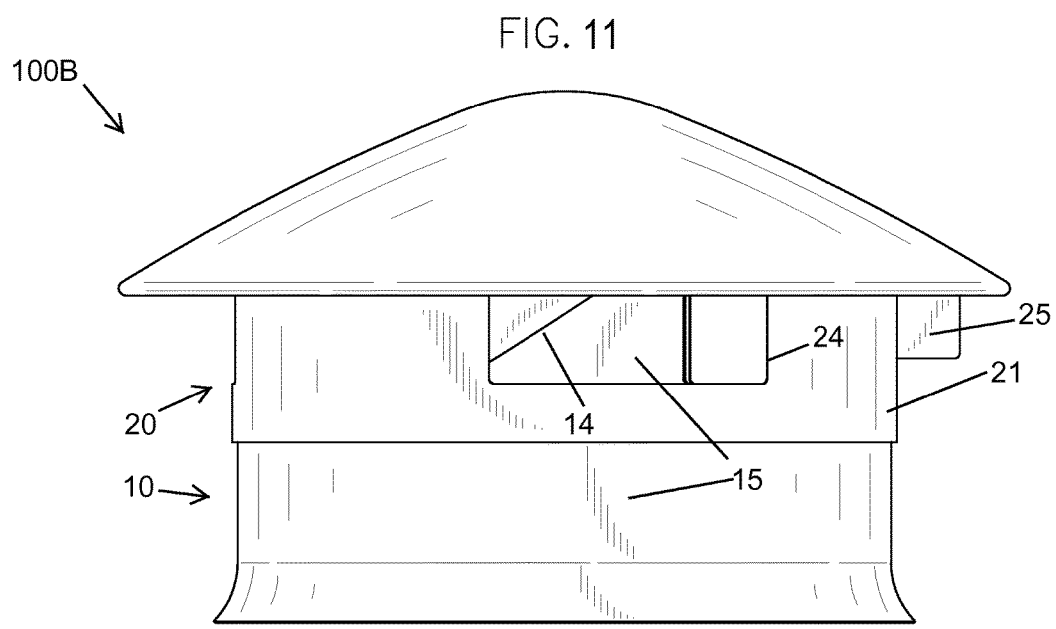

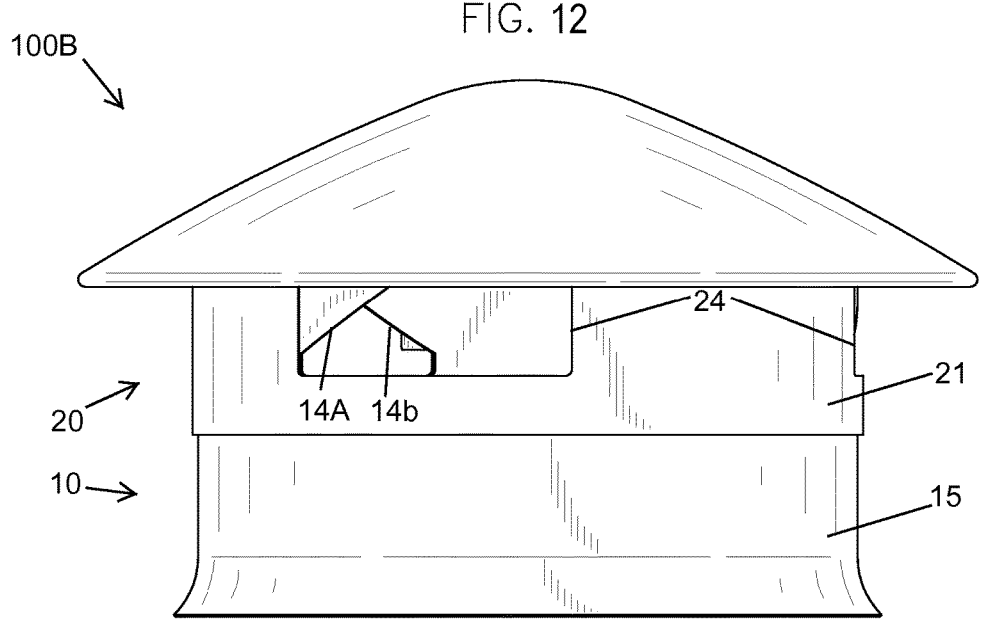
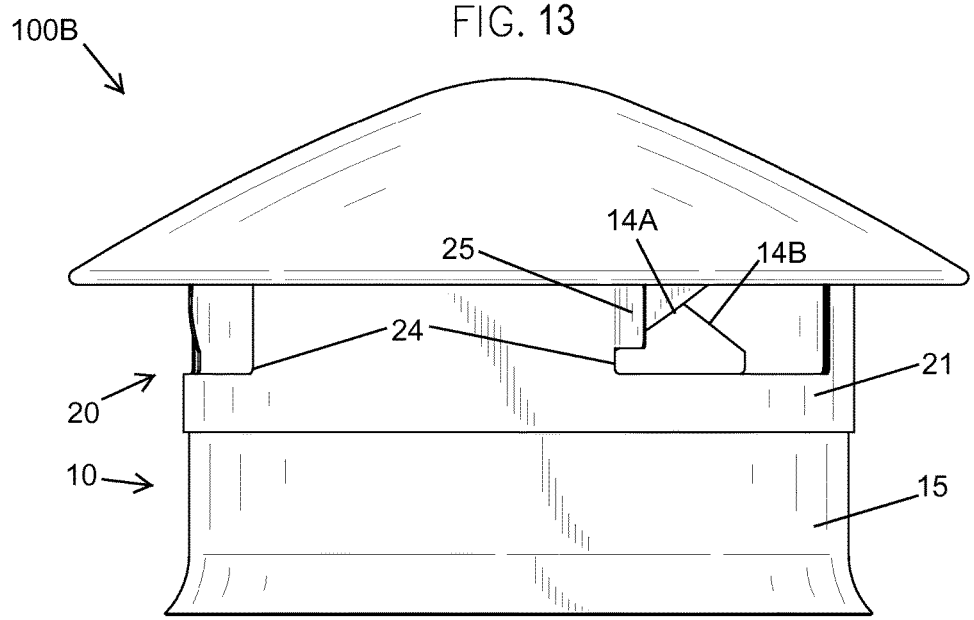

VENTED CHIMNEY CAP SYSTEM AND METHOD THEREOF

DESCRIPTION OF THE RELATED ART

This invention relates generally to the field of vented chimney caps and in particular to such caps having adjustable vents. Even more particularly the invention relates to such caps adapted for use on outdoor cooking grills having a curved or rounded cover and a short chimney stack, such as oval shaped kamado style grills as understood by one of ordinary skill in the art, and sold under the brand names as of this writing, like, THE GREEN EGG™, KAMADO JOE™, PRIMO™, and GRILL DOME™, just to name a few.

Outdoor cooking grills, like the kamado style grills described above which are both portable and non-portable, are well known and may utilize charcoal, wood, propane or electricity to produce heat for cooking food. The food is usually positioned on a grating or within a container disposed above the heat source. The grills typically have a hinged or removable half or semi-spherical cover or lid, such that the grill can be utilized in a closed mode wherein the heat is retained within the grill and the food is exposed to heat and/or smoke on all sides.

The grills may also be used in an open mode wherein only the underside of the food is exposed to heat. In the closed mode of operation, the temperature within the spherical-shaped grill can easily reach between about 200.00 degrees F. and about 700.00 degrees F.

In most conventional grills besides kamado style grills, the cooking temperature is usually controlled by adjusting the heat source, e.g., removing or adding charcoal, increasing or decreasing the gas flow, etc., since the covers are only positionable in either a fully closed or fully open status. Meanwhile, kamado style grills usually have a small diameter chimney or opening/orifice positioned in the cover that are adjustable to allow heated air and smoke to escape from the interior of the grill.

One problem with conventional openings/orifices in conventional covers of kamado style grills is that they are not designed to prevent weather elements, such as rain, sleet, hail, etc. from entering the top of the grill and onto the cooking surface and firebox. Most chimneys and/or orifices positioned in the cover of a conventional kamado style grill are perpendicular relative to the sky, and therefore, they are very susceptible to any of the aforementioned weather elements.

SUMMARY OF THE DISCLOSURE

According one exemplary embodiment, a vented chimney cap assembly or device wherein the vent openings may be adjusted from fully open to completely closed may be provided. The vented chimney cap assembly is designed and structured to be used in conjunction with an outdoor grill of the type possessing a curved or rounded removable or hinged cover having an annular chimney or smokestack.

The vented chimney cap may comprise a base member in combination with a cap member. The base member may comprise a tubular body open at the top and bottom. The bottom end may be outwardly flared or curved to better match the configuration of the base of the chimney. One or more vent openings may be provided in the wall of the base member. The cap member may comprise a tubular or cylindrical body having an open bottom and a top cover member, preferably sloped or curved and having a larger diameter than the cap main body in order to shed rain water. The tubular body of the cap member may also be provided with vent openings that correspond with the base member.

The cap member may be sized to have either a slightly larger or slightly smaller diameter than the base member tubular body, whereby the cap member can be seated onto the base member such that the cap member is external to the base member or such that the base member is external to the cap member. Because the cap member and the base member are tubular, the cap member may be rotated relative to the base member. The cap member is preferably removable from the base member for ease of cleaning and to provide a large outlet for smoke and hot gases, which may be especially useful during start-up.

The vent openings on the cap member and the base member may be aligned whereby rotation of the cap member adjusts the size of the open area of the combined vent openings. The cap member may be rotated relative to the base member such that combined open area is maximized or reduced, or may be rotated to be fully closed with no open area for the escape of heated air. A handle or tab member may be provided on the side of the vent cap tubular body for easier adjustment and rotation.

The open bottom of the base member may fit over the chimney or smokestack of the grill. The base member of the vented chimney cap assembly may be permanently or removably installed on the grill. The base member may be sized to snuggly receive the grill chimney to create a friction fit, may be affixed using mechanical fasteners, may be secured by welding, soldering or the use of high temperature adhesives or bonding agents, may be secured using an annular seal or gasket disposed between the base member and the chimney, may be secured using clips or similar biasing members, etc.

In alternative exemplary embodiments, the invention may include an vented chimney cap device comprising a tubular base member comprising an open top, an open bottom and a base member vent opening; a cap member comprising a cover member, a tubular body and a cap member vent opening positioned in said tubular body; wherein said cap member is mounted onto said base member such that said cap member is rotatable relative to said base member and such that the position of said cap member vent opening relative to said base member vent opening controls the amount of hot gases able to pass through said base member vent opening.

Likewise, a vented chimney cap device may include a tubular base member having an open top, an open bottom and a base member vent opening; a cap member having a cover member, a tubular body and a cap member vent opening positioned in said tubular body; wherein said cap member is rotatably mounted onto said base member such that the position of said cap member vent opening relative to said base member vent opening determines whether said base member vent opening is fully open, partially closed or fully closed.

Similarly, in another exemplary embodiment, a vented chimney cap device may also comprise a tubular base member having an open top, an open bottom and a plurality of base member vent openings; a cap member having a cover member, a tubular body, a tab member extending from said tubular body, and a plurality of cap member vent openings positioned in said tubular body. The number of said cap member vent openings may be equal to the number of said base member vent openings; wherein said cap member is removably and rotatably mounted onto said base member such that the position of said cap member vent openings relative to said base member vent openings determines whether said base member vent opening is fully open, partially closed or fully closed.

A vented chimney cap system may include a base member comprising an open top, an open bottom and a base member vent. The base member vent may have a first geometry. A cap member may comprise a cover member. The cap member may also have a cap member vent positioned within the cap member and having a second geometry. The second geometry of the cap member vent may be different relative to the first geometry of the base member vent. The cap member may be slidingly engaged with the base member such that the cap member is rotatable relative to said base member. An alignment of the cap member vent with the base member vent may regulate at least one of smoke and one or more hot gasses flowing through the vents.

The base member may be coupled to the chimney of a grill. The grill may comprise an oval shaped cover and an oval shaped base. The cap member may be removable from the base member. The cap member may comprise a tab member.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

FIG. 10 is a side view of the second exemplary embodiment of the vented chimney cap system illustrated in FIG. 6 in which the wall of the cap has been rotated slightly relative to wall of the base and relative to the positions shown in FIG. 5, so that the vent of the cap is more fully opened relative to FIG. 5 due to the alignment of the cap vent with the base vent.

FIG. 11 is a side view of the second exemplary embodiment of the vented chimney cap system illustrated in FIG. 10 in which the wall of the cap has been rotated slightly relative to wall of the base even further, similar to the view of FIG. 5, so that the vent of the cap is more fully closed relative to FIG. 10 due to the alignment of the cap vent with the base vent.

FIG. 12 is a side view of the second exemplary embodiment of the vented chimney cap system illustrated in FIG. 11 in which the wall of the cap and the wall of the base have been rotated slightly relative to FIG. 11, so that a second opening of the base and opposite to a first opening of the base is visible through a first opening of the base and the opening of the cap.

FIG. 13 is a side view of the second exemplary embodiment of the vented chimney cap system illustrated in FIG. 12 in which the wall of the cap and the wall of the base have been rotated slightly relative to FIG. 12, so that a second opening of the base and opposite to a first opening of the base is visible through a first opening of the base and the opening of the cap.

DETAILED DESCRIPTION

The word "exemplary" is used herein to mean "serving as an example, instance, or illustration." Any aspect described herein as "exemplary" is not necessarily to be construed as preferred or advantageous over other aspects.

Figure 1:
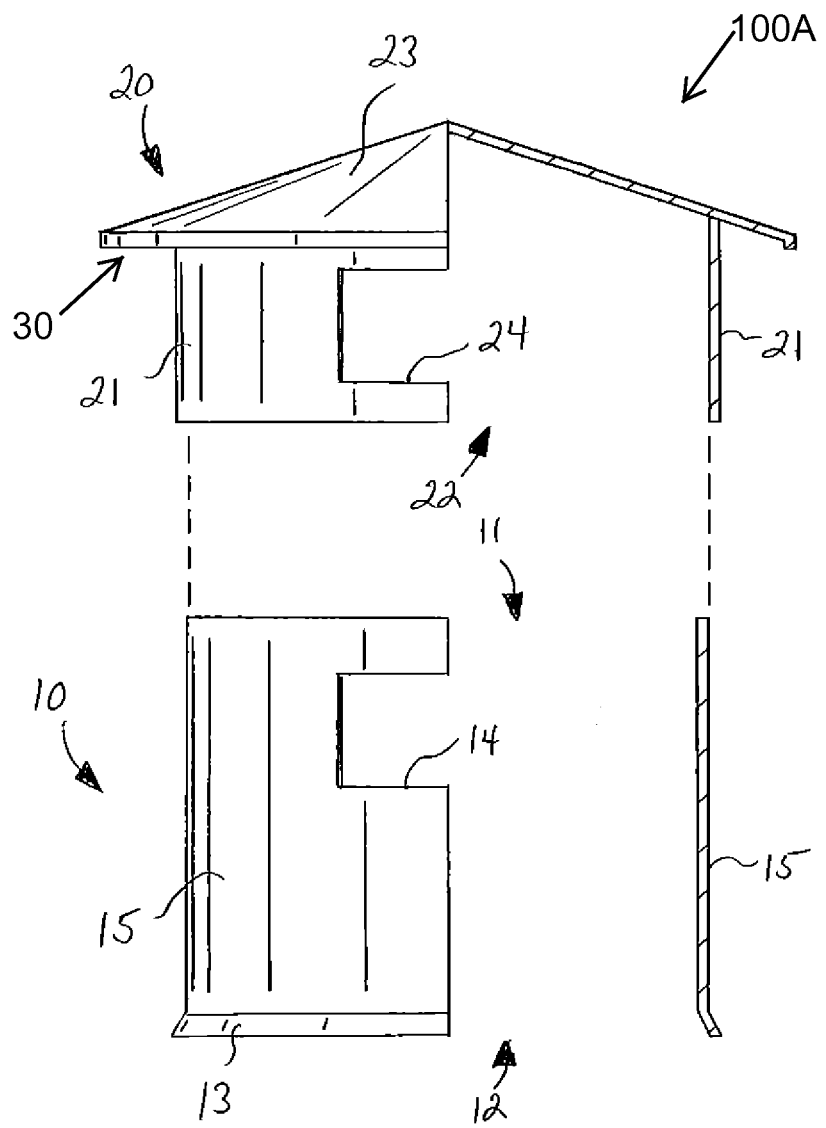
FIG. 1 is an expanded view of one exemplary embodiment of the vented chimney cap system, the right half being shown in cross-section.
Figure 2:
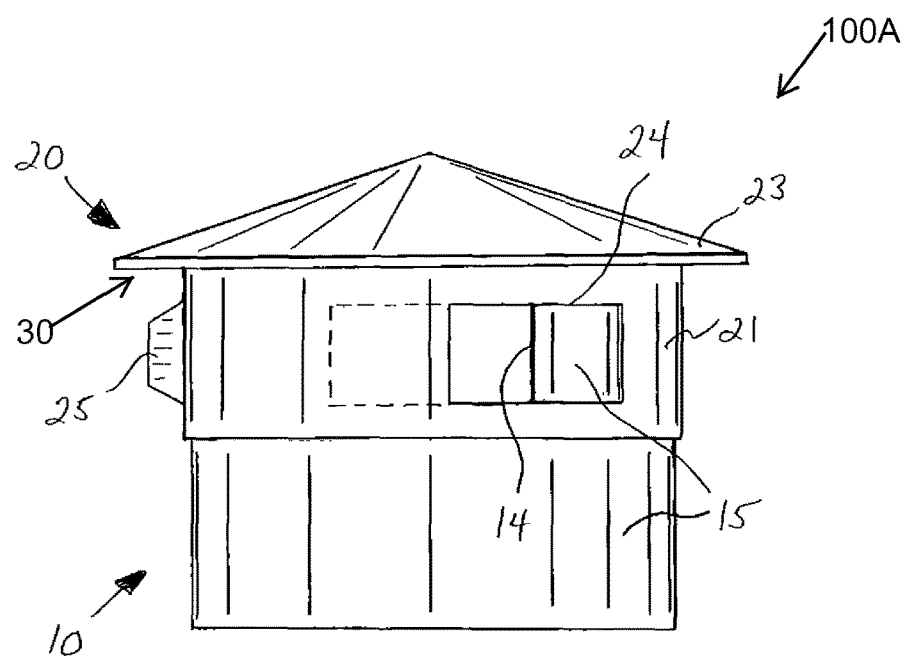
FIG. 2 is a side view of an exemplary embodiment of the vented chimney cap system in the assembled configuration.
Figure 3:
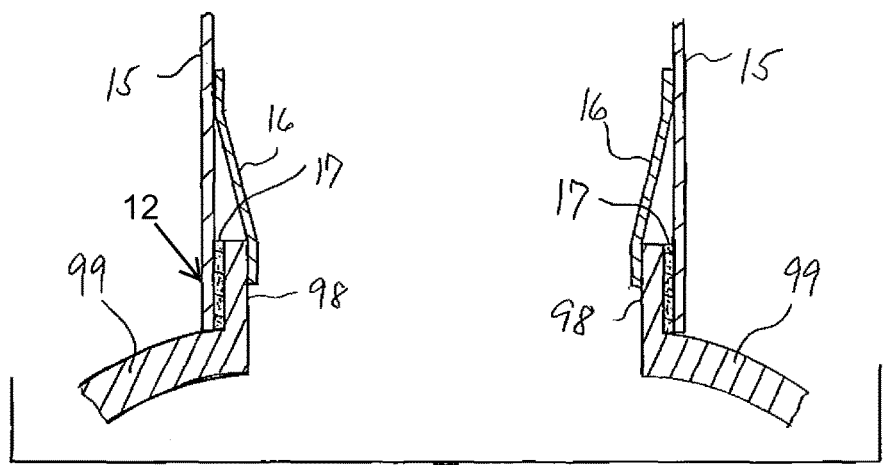
FIG. 3 is a partial midline cross-sectional view of one exemplary embodiment of the vented chimney cap system mounted onto a grill cover.

With reference to the FIGS. 1-3, the system 100A may include an adjustable vented chimney cap system 100 for controlling the outflow of smoke and hot gases from an outdoor cooking grill having a hinged or removable cover 99 with a short tubular chimney 98, such as for example the grills sold under the brand names, THE BIG GREEN EGG™, KAMADO JOE™, PRIMO™, and GRILL DOME™, just to name a few. The vented chimney cap system 100 is adjustable such that the outflow of smoke and gases from the grill may be adjusted from a fully open configuration to a completely closed configuration, or any degree between.

The vented chimney cap system 100 may comprise a base member 10 in combination with a cap member 20. The base member 10 may comprise a tubular body having a side wall 15, an open top 11 and an open bottom 12. The bottom 12 of the base member 10 may be outwardly flared or curved to define a seating configuration so as to better match with the configuration or geometry of a rounded grill cover 99. While the base member 10 and cap member 20 may comprise a cylindrical geometry, other shapes are feasible and are within the scope of this disclosure.

One or more vent openings 14 of the base member 10 may have a rectangular shape. However, other shapes for the vent openings 14 of the base member 10 are possible such as, but not limited, elliptical, round, square, pentagonal, hexagonal, octagonal. The vent openings 14 may be provided in the wall 15 of the base member 10. Further, the vent openings may also comprise asymmetrical shapes as will be described below in connection with FIGS. 4-16.

The cap member 20 may comprise a tubular body 21 having an open bottom 22 and a top cover member 23. The top cover member 23 may be sloped or curved and it may have a diameter that is larger than a diameter of the cap main body 21 to create an overhang 30. The top cover member 23 may comprise a conical shape to produce the overhang 30. This overhang 30 may help with shedding rain water and preclude entry of water into the vent openings 14 of the base member 10.

The cap member 20 may also be provided with one or more vent openings 24, which may match the number and configuration/geometry of the vent openings 14 of the base member 10 according to this exemplary embodiment. Although, in other exemplary embodiments, such as in FIGS. 4-16 described below, the size and configuration/geometry of cap member vent openings 24 may differ from those of the base member vent openings 14. The cap member body 21 may be sized to have either a slightly larger or slightly smaller diameter relative to the base member tubular body 10, whereby the cap member 20 can be seated onto the base member 10 such that the cap member 20 resides/rests on the exterior of the base member 10.

Alternatively, with a smaller diameter relative to the base member 10, the cap member 20 may reside/rest and come-in slidingly engagement with the interior of the base member 10. Because the cap member 20 and the base member 10 are preferably tubular with respect to their geometry, the cap member 20 may be rotated relative to the base member 10 about their common axis. The rotatable cap member 20 is preferably removable from the base member 10 for ease of cleaning and to provide a larger outlet for smoke and hot gases. Such a larger outlet for smoke and/or hot gases may be useful during start-up/initial heating of the interior of the grill having cover 99. The cross-sectional area of the base member 10 is usually greater than the total open area of the base member vent openings 14 and/or the cap member openings 24.

The vent openings 14 and 24 on the cap member 20 and the base member 10, respectively, are aligned whereby rotation of the cap member 20 adjusts the size of the open area of the combined vent openings 14/24. For example, rotation of the cap member 20 determines the size of the combined vent openings 14 of the base member 10 and vent openings 24 of the cap member 20. The combined openings 14/24 being adjustable in size and permit escape of hot gasses from the vented chimney cap system 100.

The cap member 20 may be rotated relative to the base member 10 such that the resulting area open for passage of hot gases is maximized (the vent openings 14/24 are fully aligned) as shown in FIG. 1, or reduced (a portion of each of the base member vent openings 14 is occluded/blocked by a portion of the cap member vent openings 24) as shown in FIG. 2, or may be rotated to provide no open area at all, i.e., the vented chimney cap assembly seals the chimney 98 (the base member vent openings 14 are completely covered by solid sections of the tubular body 21 of the cap member 20). A handle or tab member 25 may be provided on the side of the vent cap tubular body 21 for easier rotation.

The open bottom 12 of the base member 10 as illustrated in FIG. 3 fits over and directly onto the chimney or smokestack 98 of the grill cover 99. While chimney or smokestack 98 is shown in this exemplary embodiment to have a height relative to the grill cover 99, in other exemplary embodiments, the smokestack 98 may not have any height relative to grill cover 99 and it may be flush with the surface of grill cover 99 as understood by one of ordinary skill in the art.

The base member vent openings 14 are preferably located above the open bottom 12 a distance greater than the length of the chimney 98, when the chimney 98 comprises a protruding structure relative to the surface of the grill cover 99, so that they are not blocked by any portion of the chimney 98 once the base member 10 is placed onto the chimney 98. The vented chimney cap system 100 may be permanently or removably installed on the chimney 98. The open bottom 12 may be sized to snuggly receive the grill chimney 98 to create a friction fit. In alternative exemplary embodiments, the system 100 may be affixed to the chimney 98 using mechanical fasteners, such as for example thumb screws, nuts and bolts, etc.

Or in other exemplary embodiments, the system 100 may be secured by welding, soldering or the use of high temperature adhesives or bonding agents. Still, in other exemplary embodiments, the system 100 may be secured using an annular seal or gasket 17, made for example of a high temperature silicone gasket or a silicone rubberized fiberglass rope or felt and disposed between the base member 10 and the chimney 98, as shown in FIG. 3. Alternatively, the system 100 may be secured using clips or similar biasing members 16 that mount onto the open top of the chimney 98, also shown in FIG. 3, etc., or any combination of the aforementioned fastening structures.

Figure 4:
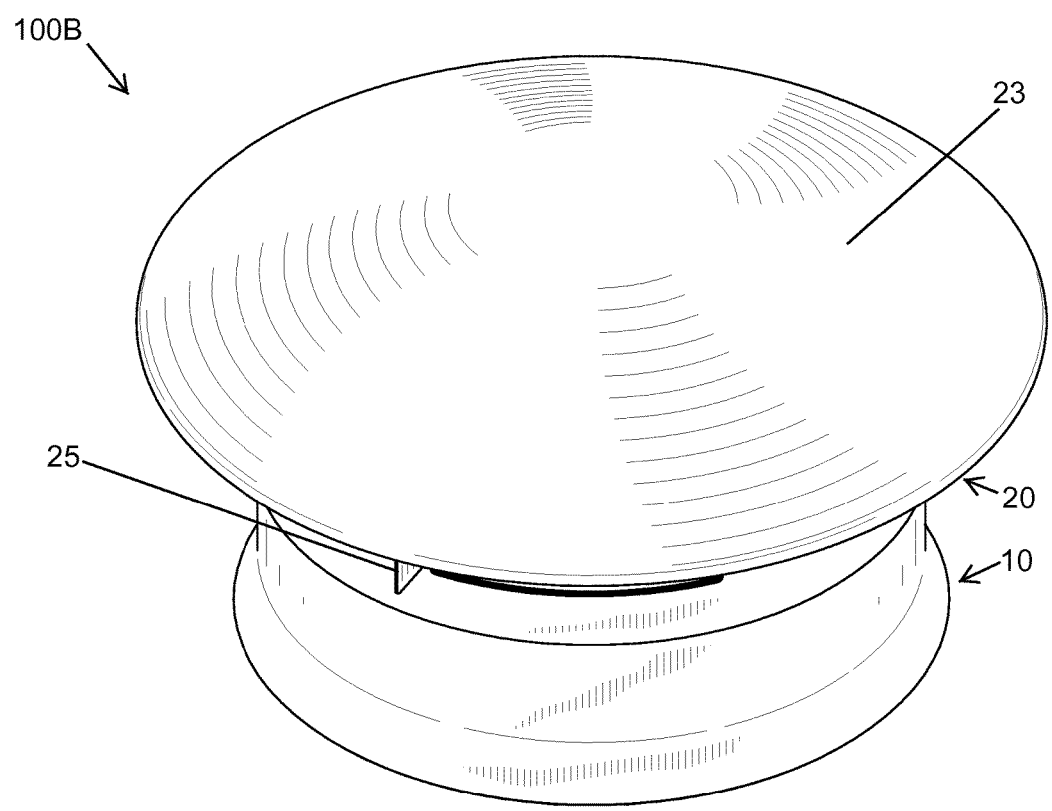
FIG. 4 is an elevational perspective view of a second exemplary embodiment of the vented chimney cap system that may be mounted on a grill cover.
Figure 16:
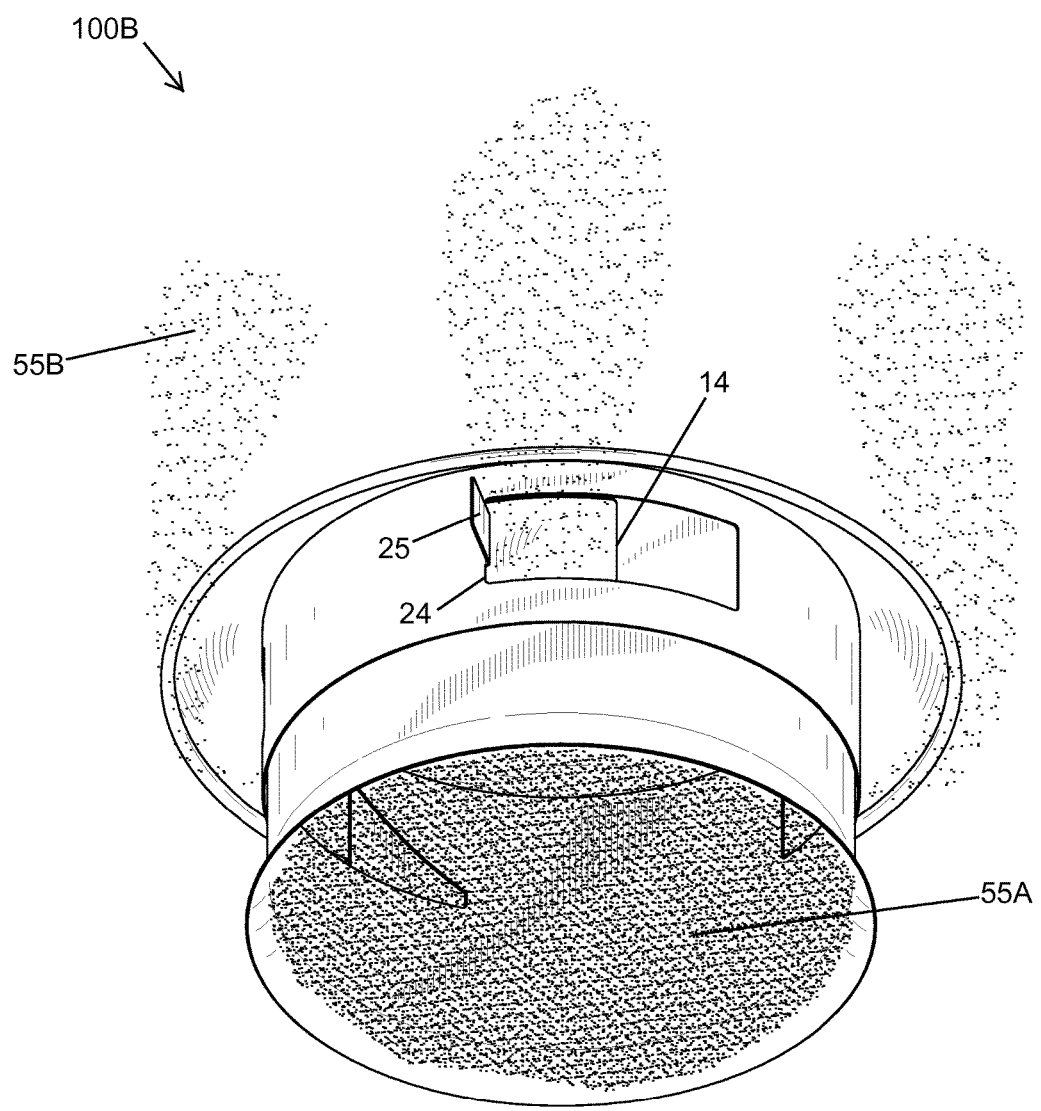
FIG. 16 is a bottom perspective view of the second exemplary embodiment of the vented chimney cap system illustrated in FIG. 4 in which smoke and/or hot gasses are illustrated, similar to FIG. 6, so that the vent of the cap is more fully opened relative to FIGS. 5 and 15 due to the alignment of the cap vent with the base vent.
Figure 17:
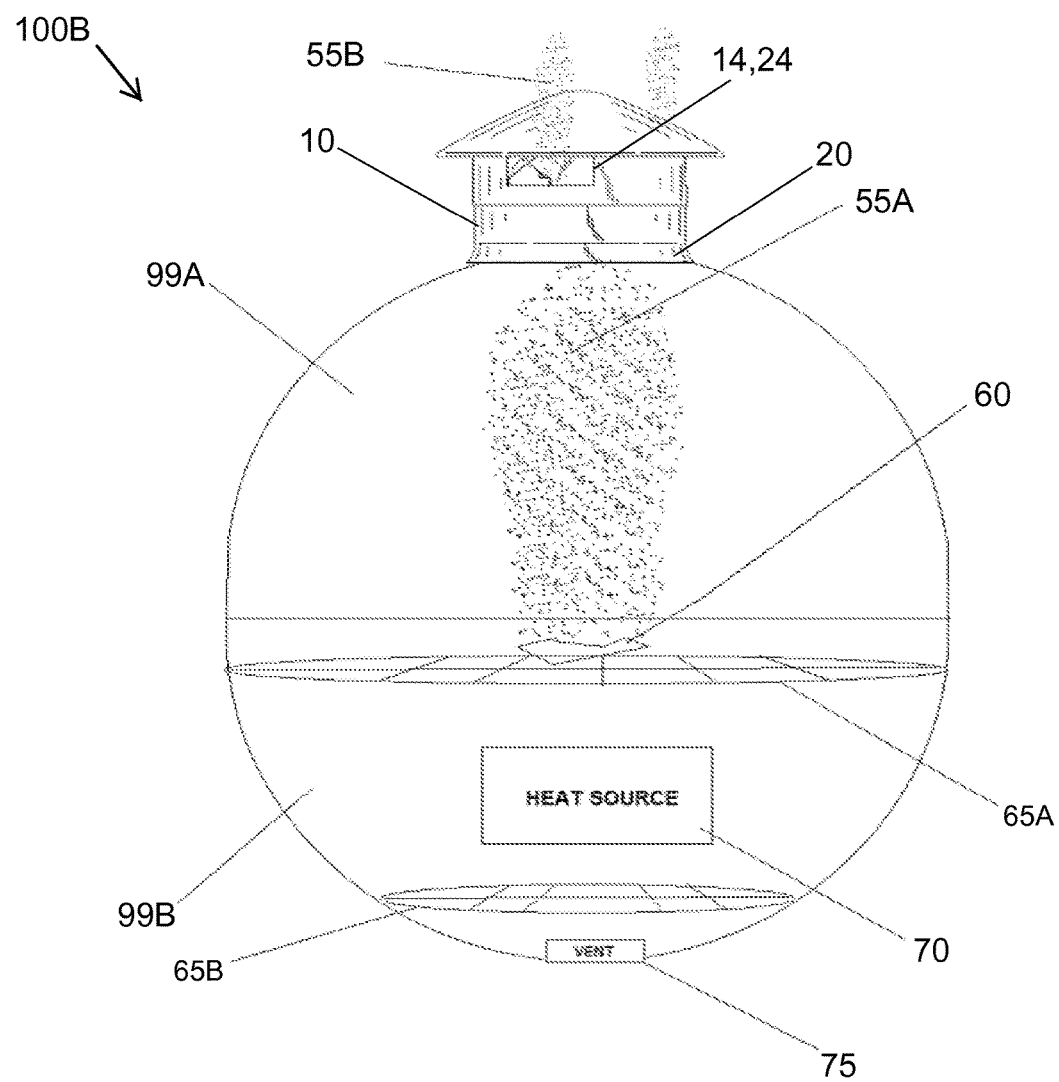
FIG. 17 is a side view of a vented chimney cap system that may comprise an oval/elliptical shaped kamado styled grill according to one exemplary embodiment of the system.

Referring now to FIG. 4, this figure is an elevational perspective view of a second exemplary embodiment of the vented chimney cap system 100B that may be mounted on a grill cover 99 (See FIG. 3 and FIG. 17 for cover 99). The second exemplary embodiment is illustrated in FIGS. 4-16. The second exemplary embodiment of FIGS. 4-16 is substantially similar to the exemplary embodiment illustrated in FIGS. 1-3. Therefore, only the differences between these two exemplary embodiments will be described below.

The system 100B of this second embodiment may also comprise one or more tabs 25 for adjusting/rotating the cap member 20 relative to the base member 10. The tabs 25 also adjust the sizes of the vents 14/24.

Figure 5:
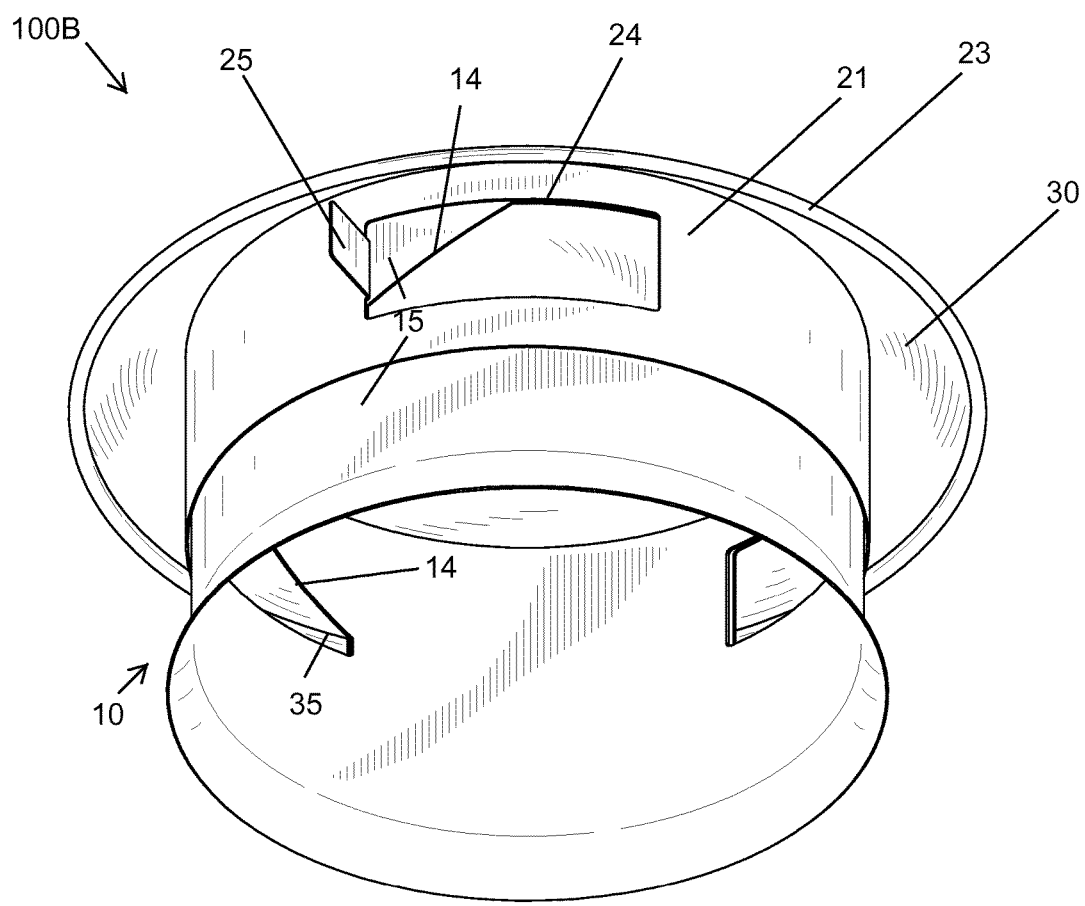
FIG. 5 is a bottom perspective view of the second exemplary embodiment of the vented chimney cap system illustrated in FIG. 4 that may be mounted on a grill cover, in which the vent of the cap is partially opened due to the alignment of the cap vent with the base vent.

Referring now to FIG. 5, this figure is a bottom perspective view of the second exemplary embodiment of the vented chimney cap system 100B illustrated in FIG. 4 that may be mounted on a grill cover 99. The vent 24 within the wall 21 of the cap member 20 is partially opened due to the alignment of the cap vent 24 with the base vent 14. As illustrated in FIG. 5, the cap vent 24 may comprise a substantially rectangular geometry. Meanwhile, the base vent 14 of the base member 10 may have a geometry which is different relative to the geometry of the cap vent 24. In this exemplary embodiment, the base vent 14 may have a geometry which comprises a tapering section 35. Further details of the base vent geometry will be more fully described below in connection with FIG. 14.

Figure 6:
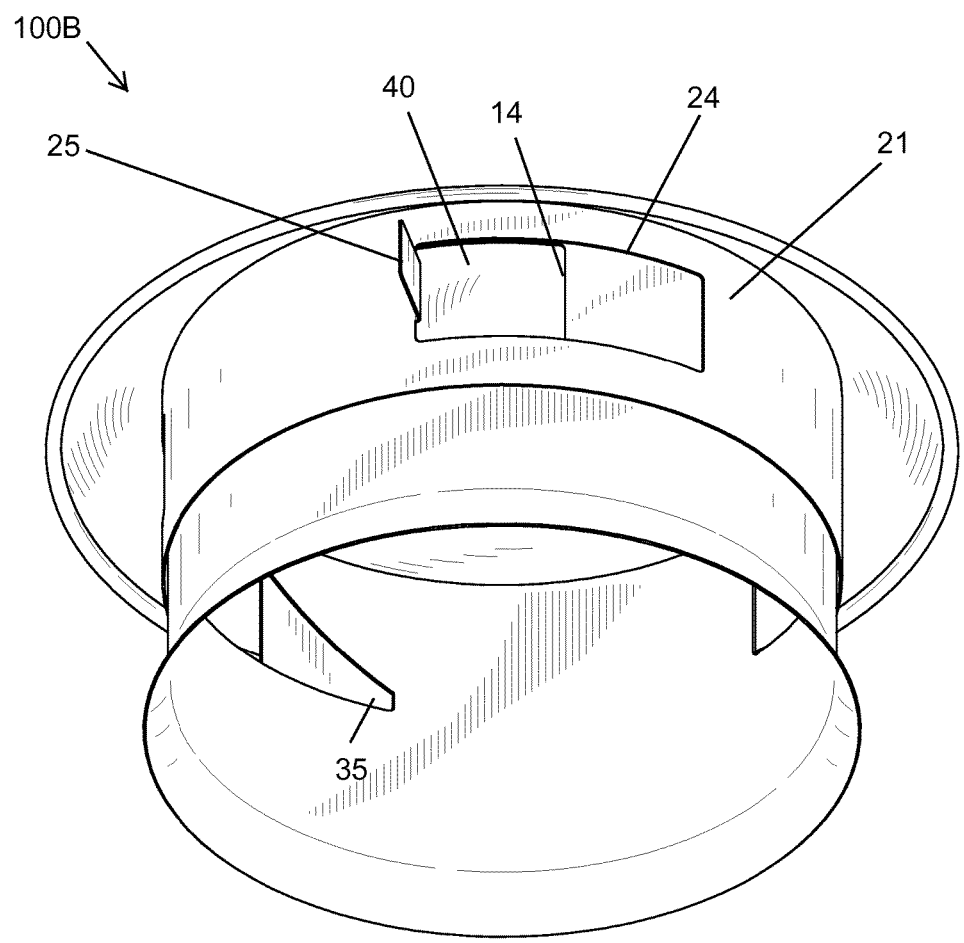
FIG. 6 is a bottom perspective view of the second exemplary embodiment of the vented chimney cap system illustrated in FIG. 4, in which the wall of the cap has been rotated slightly relative to wall of the base and relative to the positions shown in FIG. 5, so that the vent of the cap is more fully opened relative to FIG. 5 due to the alignment of the cap vent with the base vent.

Referring now to FIG. 6, this figure is a bottom perspective view of the second exemplary embodiment of the vented chimney cap system 100B illustrated in FIG. 4, in which the wall 21 of the cap member 20 has been rotated slightly relative to wall of the base member 10 and relative to the positions shown in FIG. 5, so that the vent 24 of the cap is more fully opened relative to FIG. 5 due to the alignment of the cap vent 24 with the base vent 14. In this exemplary embodiment, the base vent 14 has a geometry that has a partial rectangular section 40 which is in alignment with the rectangular shaped cap vent 24 in this exemplary embodiment.

Figure 7:
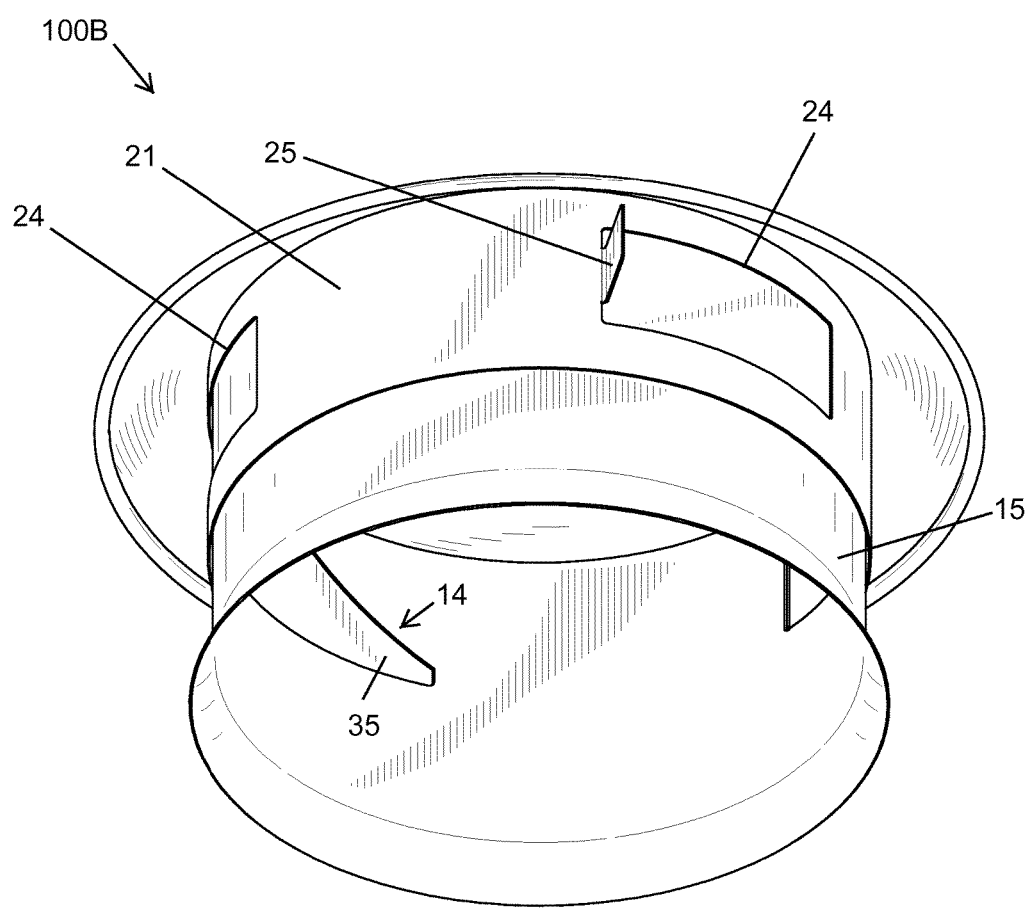
FIG. 7 is a bottom perspective view of the second exemplary embodiment of the vented chimney cap system illustrated in FIG. 4, in which the wall of the cap has been rotated slightly relative to wall of the base and relative to the positions shown in FIG. 5, in which the vent of the cap is fully closed relative to FIG. 5 due to the alignment of the cap vent with the wall of the base member.

Referring now to FIG. 7, this figure is a bottom perspective view of the second exemplary embodiment of the vented chimney cap system 100B illustrated in FIG. 4, in which the wall 21 of the cap member 20 has been rotated slightly relative to wall 15 of the base member 10 and relative to the positions shown in FIG. 5, in which the vent of the cap 24 is fully closed relative to FIG. 5 due to the alignment of the cap vent 24 with the wall 15 of the base member 10. This means that the cap vent 24 and the base vent 14 are completely out of alignment such that neither geometry of each vent overlaps each other.

Figure 8:
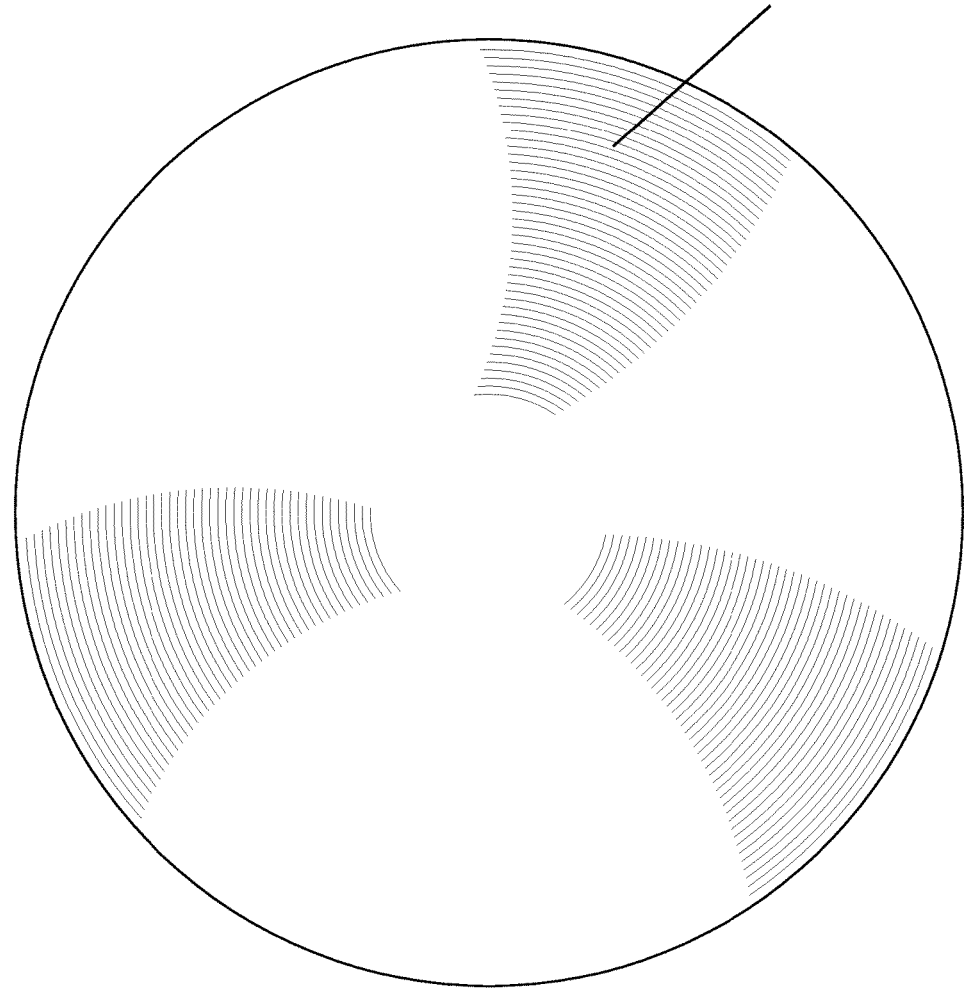
FIG. 8 is a top view of the second exemplary embodiment of the vented chimney cap system illustrated in FIG. 4.

FIG. 8 is a top view of the second exemplary embodiment of the vented chimney cap system 100B illustrated in FIG. 4. This figure demonstrates how the cover 23 is sized such that it has a diameter larger than both the cap member 20 and base member 10. In this way, the cover 23 helps to prevent weather elements, such as rain, sleet, hail, or snow from entering the cap system 100B through the vents 14/24.

Figure 9:
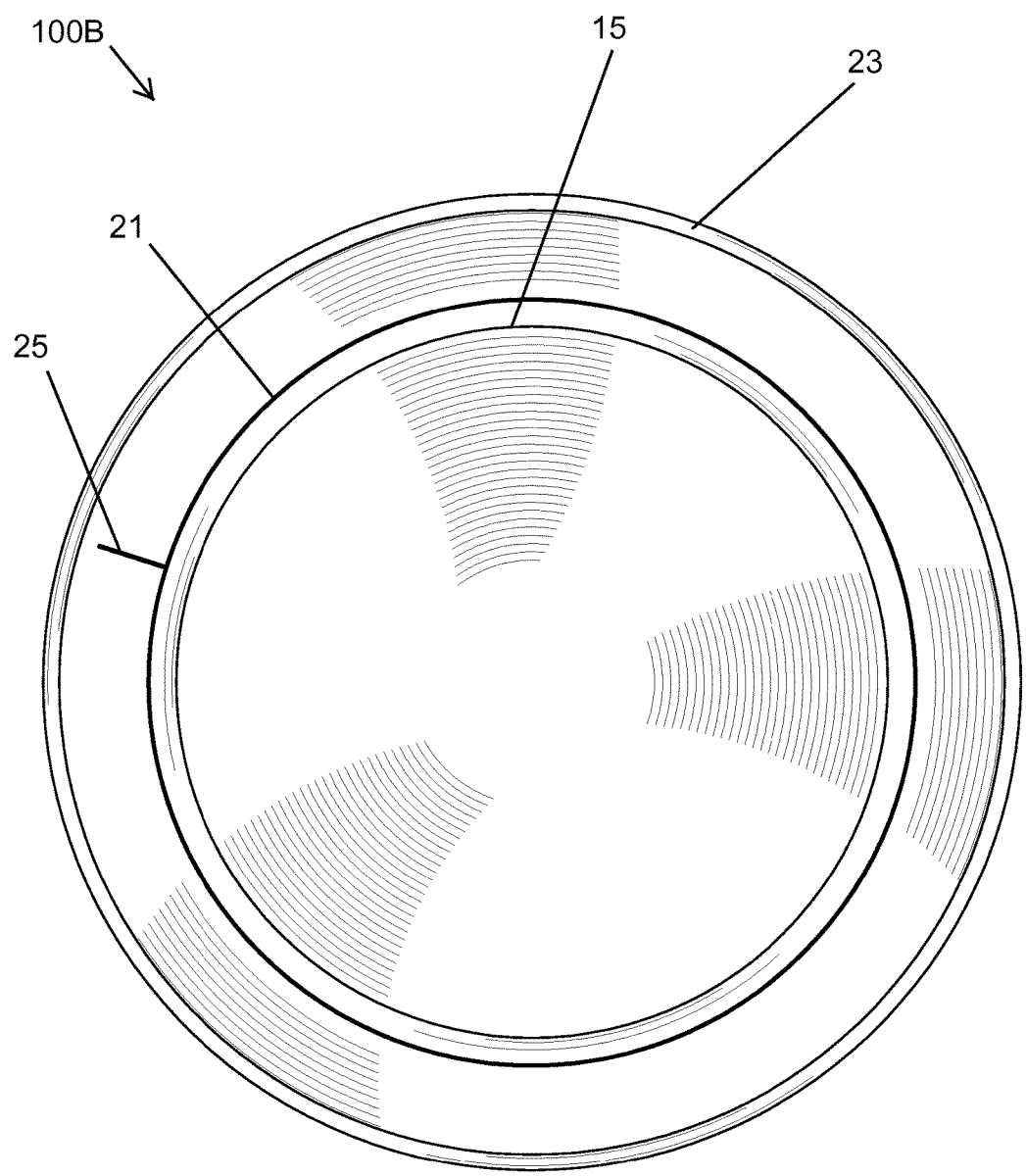
FIG. 9 is a bottom view of the second exemplary embodiment of the vented chimney cap system illustrated in FIG. 4.

FIG. 9 is a bottom view of the second exemplary embodiment of the vented chimney cap system 100B illustrated in FIG. 4. This figure illustrates the concentric alignment of the wall 15 of the base member 10 with the wall 21 of the cap member 20. The cover 23 has a diameter which is greater than the diameters of both the wall 21 of the cap member 20 and wall 15 of the base member.

FIG. 10 is a side view of the second exemplary embodiment of the vented chimney cap system 100B illustrated in FIG. 6 in which the wall 21 of the cap member 20 has been rotated slightly relative to wall 15 of the base member 10 and relative to the positions shown in FIG. 5, so that the vent 24 of the cap 20 is more fully opened relative to FIG. 5 due to the alignment of the cap vent 24 with the base vent 14.

FIG. 11 is a side view of the second exemplary embodiment of the vented chimney cap system 100B illustrated in FIG. 10. In this exemplary view, the wall 21 of the cap member 20 has been rotated slightly relative to wall 15 of the base member even further, similar to the view of FIG. 5, so that the vent 24 of the cap member 20 is more fully closed relative to FIG. 10 due to the alignment of the cap vent 24 with the base vent 14.

FIG. 12 is a side view of the second exemplary embodiment of the vented chimney cap system 100B illustrated in FIG. 11. In this view, the wall 21 of the cap member 20 and the wall 15 of the base member 10 have been rotated slightly relative to FIG. 11, so that a second vent 14B of the base member 10 and opposite to a first vent 14A of the base member 10 is visible through a first vent 14A of the base member 20 and the cap vent 24.

FIG. 13 is a side view of the second exemplary embodiment of the vented chimney cap system 100B illustrated in FIG. 12. In this view, the wall 21 of the cap member 20 and the wall 15 of the base member 10 have been rotated slightly relative to FIG. 12, so that a second vent 14B of the base member 10 and opposite to a vent 14A of the base member 10 is visible through a first vent 14A of the base member and the vent 24 of the cap member 20.

Figure 14:
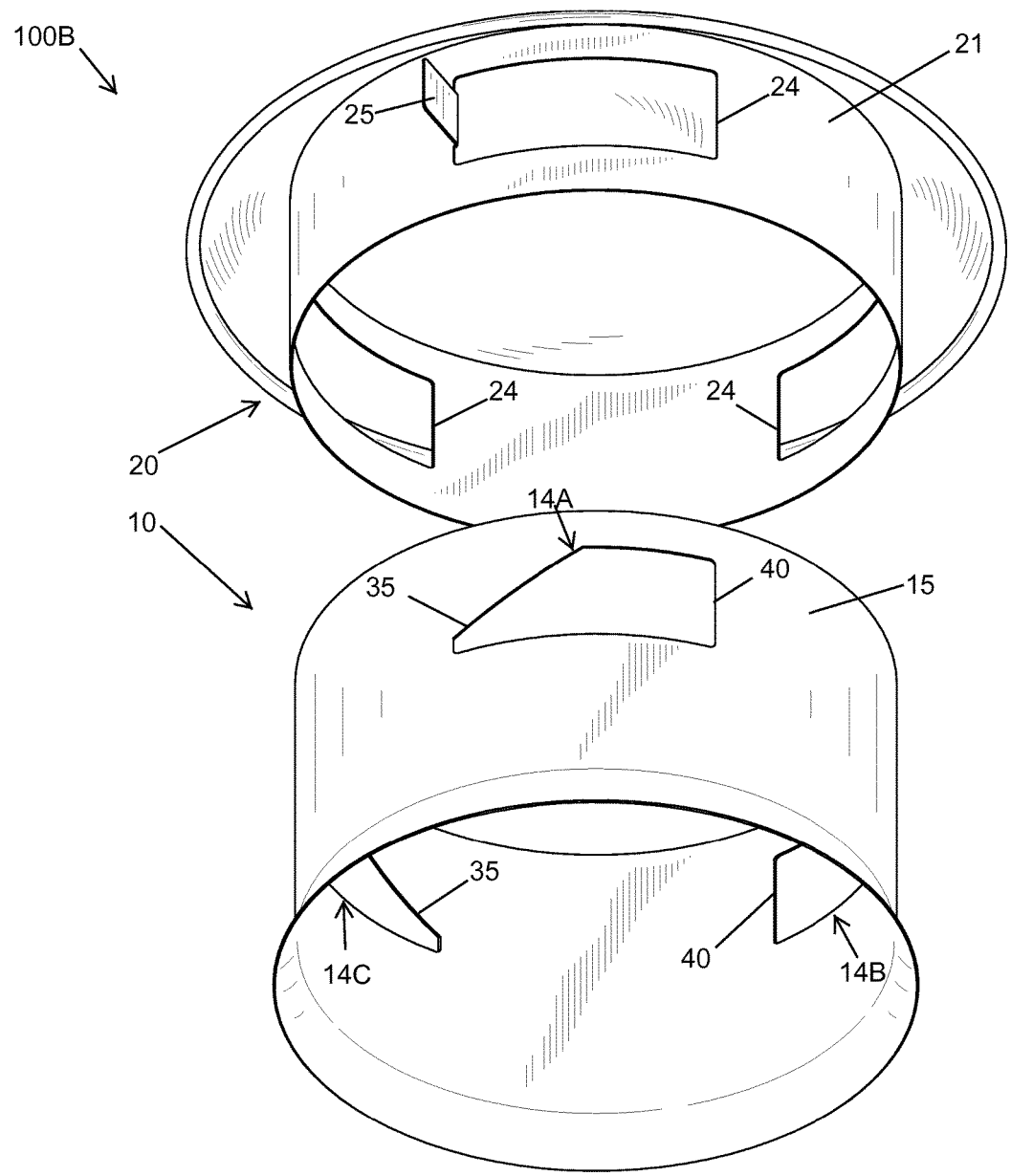
FIG. 14 is an expanded, perspective view of the second exemplary embodiment of the vented chimney cap system illustrated in FIGS. 4-13.

FIG. 14 is an expanded, perspective view of the second exemplary embodiment of the vented chimney cap system illustrated in FIGS. 4-13. In this view, the relative geometries of the vents 14, 24 are more easily visible. As noted previously, the vents 24 of the cap member 20 may comprise a rectangular geometry. However, other geometries are possible. Other geometries include, but are not limited to, circular, elliptical, pentagonal, hexagonal, octagonal, triangular, trapezoidal, etc.

The vents 14 of the base member 10 may comprise an asymmetrical geometry. In the exemplary embodiment illustrated in FIGS. 4-16, the vents 14 may comprise a geometry which has a tapering section 35. The geometry may also comprise a rectangular section 40. The asymmetrical geometry may be characterized as the combination of a right triangle and a rectangle, however, the tapering section 35 is not a perfect/complete triangle as visible in FIG. 14. However, other asymmetrical shapes are possible and are included within the scope of this disclosure as understood by one of ordinary skill in the art. Further, in other exemplary embodiments, the cap member 20 may have vents 24 that comprise an asymmetrical geometry, while the vents 14 of the base member 10 comprise a symmetrical geometry. As noted previously, in FIGS. 1-3, the vents 14/24 both comprised symmetrical geometries. In other exemplary embodiments, both vents 14/24 may also comprise asymmetrical geometries.

As illustrated in FIGS. 4-16, with the vents 14 of the base member 10 having asymmetrical geometries relative to the symmetrical geometries of the vents 24 of the cap member 20, a greater variation in adjustment of the vents 14/24 may be achieved. In other words, the relative geometries of the vents 14/24 may increase the level of fine tuning for how much the vents 14/24 are aligned for allowing heat and/or gasses to escape.

Figure 15:
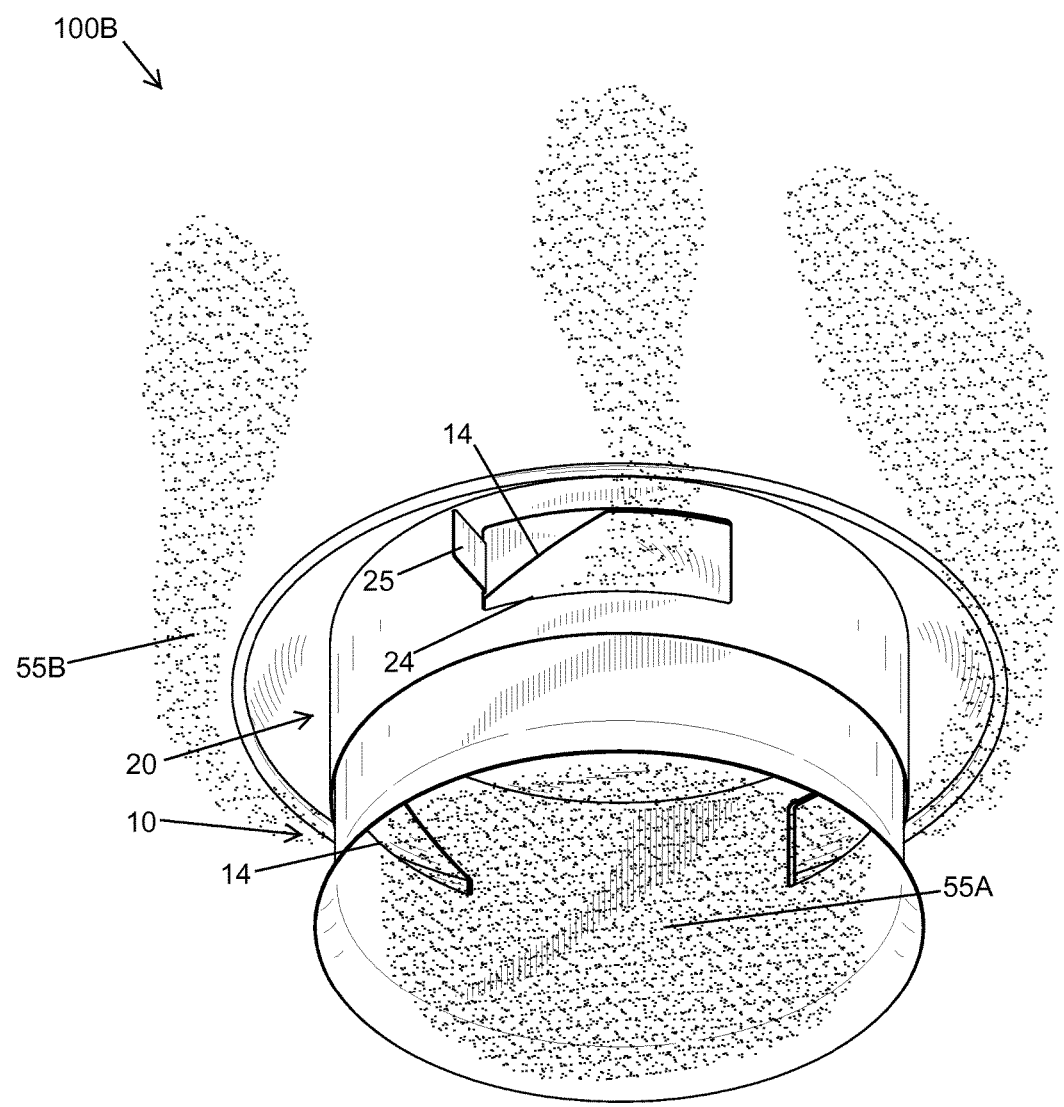
FIG. 15 is a bottom perspective view of the second exemplary embodiment of the vented chimney cap system illustrated in FIG. 4 in which smoke and/or hot gasses are illustrated, similar to FIG. 5, in which the vent of the cap is partially opened due to the alignment of the cap vent with the base vent.

FIG. 15 is a bottom perspective view of the second exemplary embodiment of the vented chimney cap system illustrated in FIG. 4 in which smoke and/or hot gasses 55 are illustrated, similar to FIG. 5, in which the vent 24 of the cap member 20 is partially opened due to the alignment of the cap vent 24 with the base vent 14. Internal smoke and/or hot gasses 55A escape through the vents 14/24 and become external smoke and/or hot gasses 55B.

FIG. 16 is a bottom perspective view of the second exemplary embodiment of the vented chimney cap system illustrated in FIG. 4 in which smoke and/or hot gasses 55 are illustrated, similar to FIG. 6, so that the vent 24 of the cap member 20 is more fully opened relative to FIGS. 5 and 15 due to the alignment of the cap vent 24 with the base vent 14. Internal smoke and/or hot gasses 55A escape through the vents 14/24 and become external smoke and/or hot gasses 55B. Compared to the view of FIG. 15, the alignment of the vents 14/24 in FIG. 16 is reduced such that less smoke/hot gasses 55 escape from the inner volume defined by the system 100B. In other words, the size of the vent apertures/openings formed by vents 14/24 in FIG. 16 is less than the size of the vent apertures formed by vents 14/24 in FIG. 15.

FIG. 17 is a side view of a vented chimney cap system 100B that may comprise an oval/elliptical shaped kamado style grill 99, which may have a top cover 99A and bottom or base 99B according to one exemplary embodiment of the system 100B. The top cover 99A and the base 99B may be constructed from heat resistant materials, such as metal, ceramics, or composites. The grill 99 may comprise a heat source 70 and a first support grate 65A.

The heat source 70 may comprise charcoal, wood, lighted gas emitted from a gas valve (i.e. propane or natural gas), electricity, etc. The heat source 70 may be supported by a second support grate 65B. While the heat source 70 is illustrated as existing above the second support grate 65B, the heat source 70 may be in physical contact with the second support grate 65B.

The first support grate 65A may hold food stuff 60 such that the food stuff is elevated above the heat source 70 for cooking. The food stuff 60 may comprise any type of food, such as meat, fish, vegetables, fruit, pre-packaged items, etc. When the food stuff 60 is cooked by the heat source 70, heated gasses, such as, but not limited to, heated air, may combine with the smoke generated by the food stuff 60 to create internal smoke/gasses 55A which rise(s) towards the vented chimney cap that has the cap member 20 and base member 10.

The internal smoke/gasses 55A enter the volume formed by the cap member 20 and base member 10 and exit through the vents 14/24 where the internal smoke/gasses 55A become external smoke/gasses 55B. Rotation of the cap member 20 relative to the base member 10 controls the size of the vents 14/24 and hence, regulates the amount of heat/smoke contained within the grill 99. When the vents 14/24 are opened to a maximum extent, then a larger amounts of smoke and/or heat may exit the grill 99, while smaller amounts (and in some instances, complete obstruction/blockage may occur) of smoke and/or heat may exit the grill 99 when the vents 14/24 are closed to a maximum extent.

Grills 99 that use a natural, combustible heat source 70, like charcoal and/or wood also typically have a bottom adjustable air intake vent 75 which may be positioned below the heat source 70. In the kamado style grill 99, the upper top cover 99A above the cooking surface usually has a short chimney stack 98 (see FIG. 1) and within the chimney stack 98 an adjustable vent (not illustrated) may be adjusted to open and/or close the chimney stack. The air intake vent 75 and the amount of air exiting the chimney 98 may be adjusted to regulate the amount of oxygen available to the heat source 70 and thus control the cooking temperature.

With the system 100B of FIG. 17, the cooking temperature within the grill 99 may be controlled by adjusting the heat source 70, e.g., removing or adding charcoal, increasing or decreasing the combustible gas flow, etc., and/or by adjusting the adjustable air vents 14, 24, and 75. Adjusting the air exhaust vents 14, 24, and air intake vent(s) 75 regulates the amount of oxygen available to the natural, combustible heat source 70 like charcoal or wood.

Exhaust vents 14, 24 control the amount of exhaust gases exiting/escaping the grill 99 while the intake vent(s) 75 under the heat source 70 control(s) the amount of air containing oxygen entering the grill 99. Keeping more exhaust gases within the grill 99 by closing vents 14, 24 may lower the oxygen content within the grill 99. Meanwhile, allowing more air to enter the grill 99 by opening air intake vent 85 may increase the oxygen content within the grill 99.

Figure 18:
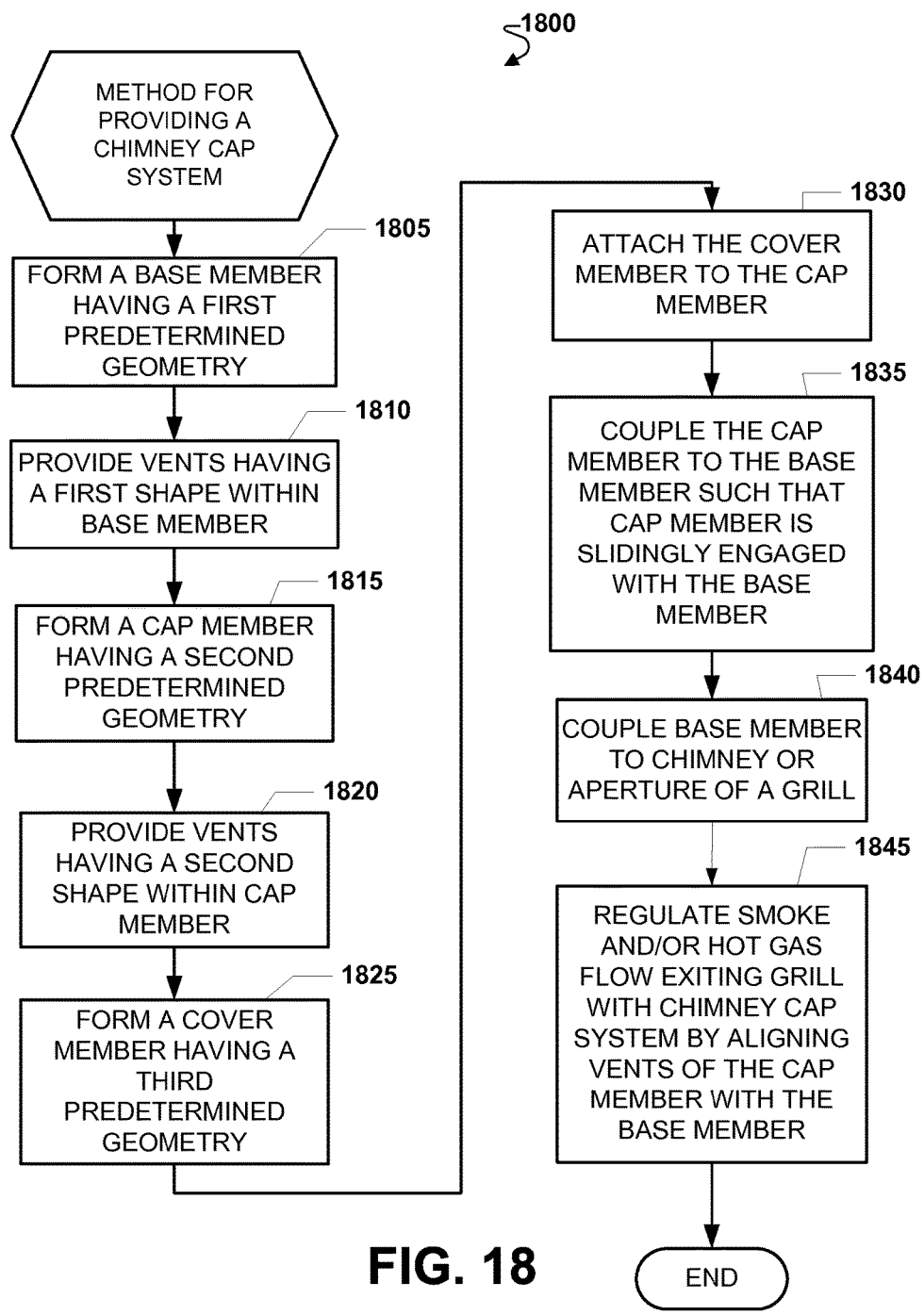
FIG. 18 is a logical flow chart illustrating exemplary steps for a method of providing a vented chimney cap system according to one exemplary embodiment.

FIG. 18 is a logical flow chart illustrating exemplary steps for a method 1800 of providing a vented chimney cap system 100 according to one exemplary embodiment. Block 1805 is the first step of method 1800. In block 1805, a base member 10 having a first predetermined geometry may be formed. According to one exemplary embodiment, such as illustrated in FIGS. 1-17, the base member 10 is provided with a tubular or cylindrical geometry. However, other geometries are possible, such as, but not limited to, elliptical and other polygonal shapes, like pentagonal, hexagonal, octagonal, etc. The base member 10 may be fabricated from metal, but other materials may be used, such as, but not limited to, ceramics, composites, etc.

Next in block 1810, vents 14 having a first shape may be provided within the base member 10, such as illustrated in FIGS. 1-17. The first shape may comprise a symmetrical geometry, like a rectangle illustrated in FIGS. 1-3, or the first shape may comprise an asymmetrical geometry such as illustrated in FIGS. 4-16. Exemplary symmetrical geometries include, but are not limited to, spherical, elliptical, rectangular, triangular, pentagonal, octagonal, trapezoidal, pentagonal, etc.

One or more vents 14 may be provided in the base member 10. In the exemplary embodiment of FIGS. 1-3, only two vents 14 are provided. In the exemplary embodiment of FIGS. 4-16, three vents 14 are provided. The number of vents 14 within the base member 10 may match the number of vents 24 provided in the cap member 20. However, the number of vents 14 within the base member 10 may be different than the number of vents 24 provided in the cap member 20, where the base member vents 14 may be less than or greater than the cap vents 24. The base vents 14 may be equal in size relative to the cap vents 24 or they may be different in size and/or shape relative to each other.

Subsequently, in block 1815, a cap member 20 having a second predetermined geometry such as illustrated in FIGS. 1-16 may be formed from a material. According to one exemplary embodiment, such as illustrated in FIGS. 1-17, the cap member 20 is also provided with a tubular or cylindrical geometry, similar to the base member 10. However, other geometries are possible, such as, but not limited to, elliptical and other polygonal shapes, like pentagonal, hexagonal, octagonal, etc. The cap member 20, like the base member 10, may be fabricated from metal, but other materials may be used, such as, but not limited to, ceramics, composites, etc. The cap member 20 has a diameter which is sized slightly larger than a diameter of the base member 10 so that the cap member 20 may fit over and receive the base member internally.

Next, in block 1820, vents 24 having a second shape may be provided within the cap member 20, such as illustrated in FIGS. 1-17. The second shape may comprise a symmetrical geometry, like a rectangle illustrated in FIGS. 1-3, or the second shape may comprise an asymmetrical geometry such as illustrated in FIGS. 4-16. Exemplary symmetrical geometries include, but are not limited to, spherical, elliptical, rectangular, triangular, pentagonal, octagonal, trapezoidal, pentagonal, etc.

One or more vents 24 may be provided in the cap member 20. In the exemplary embodiment of FIGS. 1-3, only two vents 24 are provided. In the exemplary embodiment of FIGS. 4-16, three vents 24 are provided. The number of vents 24 within the cap member 20 may match the number of vents 14 provided in the base member 10. However, the number of vents 14 within the cap member 20 may be different than the number of vents 14 provided in the base member 10, where the cap member vents 24 may be less than or greater than the base vents 14. The base vents 14 may also be equal in size relative to the cap vents 24 or they may be different in size and/or shape relative to each other.

Subsequently, in block 1825, a cover member 23 with a third predetermined geometry may be formed from a material. According to the exemplary embodiments illustrated in FIGS. 1-17, the cover member may have a conical geometry. However, other geometries are feasible and are included within the scope of this disclosure. Other geometries include, but are not limited to, tetrahedronal, rectangular, square, or any polygonal shape that may form the base of a pyramid.

In block 1830, the cover member 23 may be attached to the cap member 20. The cover member 23 may be attached using any one or a combination of fastening mechanisms. Exemplary fastening mechanisms include, but are not limited to, welds, adhesives, screws, bolts, nuts & bolts, etc.

Next, in block 1835, the cap member 20 is coupled to the base member 10 such that the cap member 20 is slidingly engaged with the base member 10. As noted previous, the cap member 20 may have a diameter and/or geometry such that it is slightly larger than the cap member 20, so that the cap member 20 may receive a portion of the base member within a volume defined by the cap member 20.

According to the exemplary embodiments illustrated in FIGS. 1-17, the cap member 20 is only slightly larger than the base member 10, so that a friction fit exists between the cap member 20 and the base member 10 as understood by one of ordinary skill in the art. This friction fit means that the cap member 20 will rotate relative to the base member 10 when a force is applied to the cap member 20. The cap member 20 will remain in place and will not rotate relative to the base member 10 unless a force is applied to overcome the frictional force provided by the friction fit between the two members as understood by one of ordinary skill in the art.

After block 1835, in block 1840, the base member 10 is coupled to the chimney or aperture of a grill 99 such as illustrated in FIG. 3 and in FIG. 17. The base member 10 may be permanently or removably installed on the chimney 98 illustrated in FIG. 3. The open bottom 12 of base member 10 may be sized to snugly receive the grill chimney 98 to create a friction fit. In alternative exemplary embodiments, the system 100 may be affixed to the chimney 98 using mechanical fasteners, such as for example thumb screws, nuts and bolts, etc. A Or in other exemplary embodiments, base 10 may be secured by welding, soldering or the use of high temperature adhesives or bonding agents. Still, in other exemplary embodiments, the base 10 may be secured using an annular seal or gasket 17, made for example of a high temperature silicone gasket or a silicone rubberized fiberglass rope or felt and disposed between the base member 10 and the chimney 98, as shown in FIG. 3.

Alternatively, the base 10 may be secured using clips or similar biasing members 16 that mount onto the open top of the chimney 98, also shown in FIG. 3, etc., or any combination of the aforementioned fastening structures. In some embodiments where the grill 99 does not have a protruding chimney, but instead, just an aperture/opening, the base member 10 may simply rest over and enclose the aperture within the grill 99.

And subsequently, in Block 1845, smoke and/or hot gas(es) flow exiting the grill 99, such as illustrated in FIG. 17, may be regulated with the chimney cap system 100 by aligning the vents 24 of the cap member 20 with the vents 14 of the base member 10. The vents 24/14 may be aligned by rotating the cap member 20 relative to the base member as described above and as illustrated in FIGS. 1-16. Further, in addition to adjusting the exhaust vents 14, 24, of the system 100, the air intake vent(s) 75 positioned beneath the heat source 70 may be manipulated to increase and/or decrease the amount of oxygen available to the heat source 70. This regulation of oxygen and the smoke and/or hot gas(es) with the chimney cap system 100 allow for fine tuning or fine temperature control of the temperature within the grill 99 for assisting with the cooking of the food stuff 60. After Block 1845, the method then ends.

The vented chimney cap system 100 may be preferably made of a relatively thin sheet metal, such as stainless steel. But the system 100 may comprise any material suitable for high temperature and outdoor use, such as, but not limited to, ceramics, a combination of metal and ceramics, composite materials, and the like.

Although a few exemplary embodiments have been described in detail above, those skilled in the art will readily appreciate that many modifications are possible in the embodiments without materially departing from this disclosure. Accordingly, such modifications are intended to be included within the scope of this disclosure as defined in the following claims. In the claims, means-plus-function clauses are intended to cover the structures described herein as performing the recited function and not only structural equivalents, but also equivalent structures.

Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, sixth paragraph for any limitations of any of the claims herein, except for those in which the claim expressly uses the words 'means for' together with an associated function.

What is claimed is:

1. A vented chimney cap system comprising:
   a base member comprising an open top, an open bottom and a base member vent, the base member vent having a first geometry;
   a cap member comprising a cover member, a cap member vent positioned within the cap member and having a second geometry, wherein the second geometry is different relative to the first geometry; wherein said cap member is slidingly engaged with said base member such that said cap member is rotatable relative to said base member, and an alignment of the cap member vent with the base member vent regulates at least one of smoke and one or more hot gasses flowing through the vents; and
   an annular gasket disposed within the base member, the annular gasket frictionally resisting removal of the base member when the base member is installed.

2. The system of claim 1, further comprising a grill having a chimney, the base member receiving at least a portion of the chimney, the annular gasket being disposed between the base member and the portion of the chimney received in the base member, and the annular gasket frictionally resisting removal of the base member from the chimney.

3. The system of claim 2, wherein the grill comprises an oval shaped cover and an oval shaped base.

4. The system of claim 1, wherein said cap member is removable from said base member.

5. The system of claim 1, wherein said cap member further comprises a radially extending tab member.

6. The system of claim 1, further comprising a plurality of base member vent openings and a plurality of cap member vent openings.

7. The system of claim 1, wherein said cap member further comprises a seating flange.

8. The system of claim 1, wherein the base member and cap member comprise metal.

9. A method for providing a chimney cap system comprising:
  forming a base member comprising an open top, an open bottom and a base member vent, the base member vent having a first geometry;
  providing an annular gasket disposed within the base member;
  forming a cap member with a cap member vent positioned within the cap member and having a second geometry, wherein the second geometry is different relative to the first geometry;
  forming a cover member;
  attaching the cover member to the cap member;
  coupling the cap member to the base member such that the cap member is slidingly engaged with the base member;
  coupling the base member to a chimney of a grill by receiving at least a portion of the chimney in the base member, the annular gasket being disposed between the base member and the portion of the chimney received in the base member, and the annular gasket frictionally resisting removal of the base member from the chimney.

10. The method of claim 9, wherein the grill comprises an oval shaped cover and an oval shaped base.

11. The method of claim 10, wherein the oval shaped cover and oval shaped base are made of a metal material.

12. The method of claim 9, wherein said cap member is removable from said base member.

13. The method of claim 9, further comprising providing a tab member that protrudes from the cap member.

14. The method of claim 9, further comprising providing a plurality of base member vent openings and a plurality of cap member vent openings.

15. The method of claim 9, wherein the cap member and base member are made of a metal material.

16. The system of claim 15, wherein the cap member means and base member means are made of a metal material.

17. A system for providing a chimney cap system comprising:
  base member means for creating a first volume comprising an open top,
  an open bottom and a base member vent, the base member vent having a first geometry;
  cap member means for creating a second volume comprising a cap member vent positioned within the cap member and the cap member vent having a second geometry, wherein the second geometry is different relative to the first geometry;
  cover member means having a cross-sectional area greater than a crosssectional area of the cap member means;
  means for attaching the cover member to the cap member;
  means for coupling the cap member to the base member;
  means for coupling the base member to a chimney of a grill, at least a portion of the chimney being received in the base member, wherein at least one of smoke and one or more hot gasses exiting the chimney cap system from the grill are regulated by aligning the base member vent with the cap member vent, said means for coupling the base member comprising an annular gasket disposed within the base member between the base member and the portion of the chimney
  received in the base member, the annular gasket frictionally resisting removal of the base member from the chimney.

18. The system of claim 17, wherein the grill comprises an oval shaped cover and an oval shaped base.

19. The system of claim 17, wherein said cap member means is removable from said base member means.

20. The system of claim 17, further comprising a tab member that protrudes from the cap member.

* * * * *